(12) United States Patent
Michisaka et al.

(10) Patent No.: US 7,287,615 B2
(45) Date of Patent: Oct. 30, 2007

(54) FRONT STRUCTURE OF MOTORCYCLE (75) Inventors: Susumu Michisaka, Saitama (JP);
Masao Ogawa, Saitama (JP);
Tomokatsu Suda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 195 days.

(21) Appl. No.: 10/885,630

(22) Filed: Jul. 8, 2004

(65) Prior Publication Data
US 2005/0006169 A1 Jan. 13, 2005

(30) Foreign Application Priority Data
Jul. 11, 2003 (JP) ............................. 2003-195663

(51) Int. Cl.
*B60P 3/00* (2006.01)
(52) U.S. Cl. ...................... 180/219; 224/420
(58) Field of Classification Search ................ 180/219, 180/218, 220, 312; 280/274, 281.1, 288.4; 362/476; 224/413, 420
See application file for complete search history.

(56) References Cited

U.S. PATENT DOCUMENTS

| 4,438,828 A | * | 3/1984 | Nakagawa | ................. 180/219 |
| 4,709,774 A | * | 12/1987 | Saito et al. | ................. 180/229 |
| 4,721,179 A | * | 1/1988 | Yamaguchi et al. | ........ 180/219 |
| 4,722,031 A | * | 1/1988 | Matsuyama et al. | ........ 362/476 |
| 6,135,625 A | * | 10/2000 | Kodaira et al. | ............. 362/476 |
| 6,644,693 B2 | * | 11/2003 | Michisaka et al. | .......... 280/835 |
| 2002/0046891 A1 | * | 4/2002 | Honda et al. | ................ 180/220 |

FOREIGN PATENT DOCUMENTS

JP 59-42771 U 3/1984

\* cited by examiner

*Primary Examiner*—Tony Winner
(74) *Attorney, Agent, or Firm*—Birch, Stewart, Kolasch & Birch, LLP (57) ABSTRACT

A load receiving pipe extends from a separate frame and has a closed portion at the extremity thereof. A meter unit is disposed immediately behind the closed portion. Accordingly, the meter unit can be accommodated in a limited space in front of a handle post cover and behind the load receiving pipe, and the probability that a load on the load receiving pipe comes into contact with the meter unit can be avoided. Therefore, the appearance of the front portion of a vehicle body can be improved while improving the load receiving capacity at the front of the vehicle body.

20 Claims, 10 Drawing Sheets

BACKGROUND ART

FRONT STRUCTURE OF MOTORCYCLE

CROSS-REFERENCE TO RELATED APPLICATIONS

This nonprovisional application claims priority under 35 U.S.C. §119(a) on Patent Application No. 2003-195663, filed in Japan on Jul. 11, 2003, the entirety of which is incorporated herein by reference.

BACKGROUND OF THE INVENTION

1. Field of the Invention

The present invention relates to an improvement of a front structure of a motorcycle.

2. Description of Background Art

Figure 10:
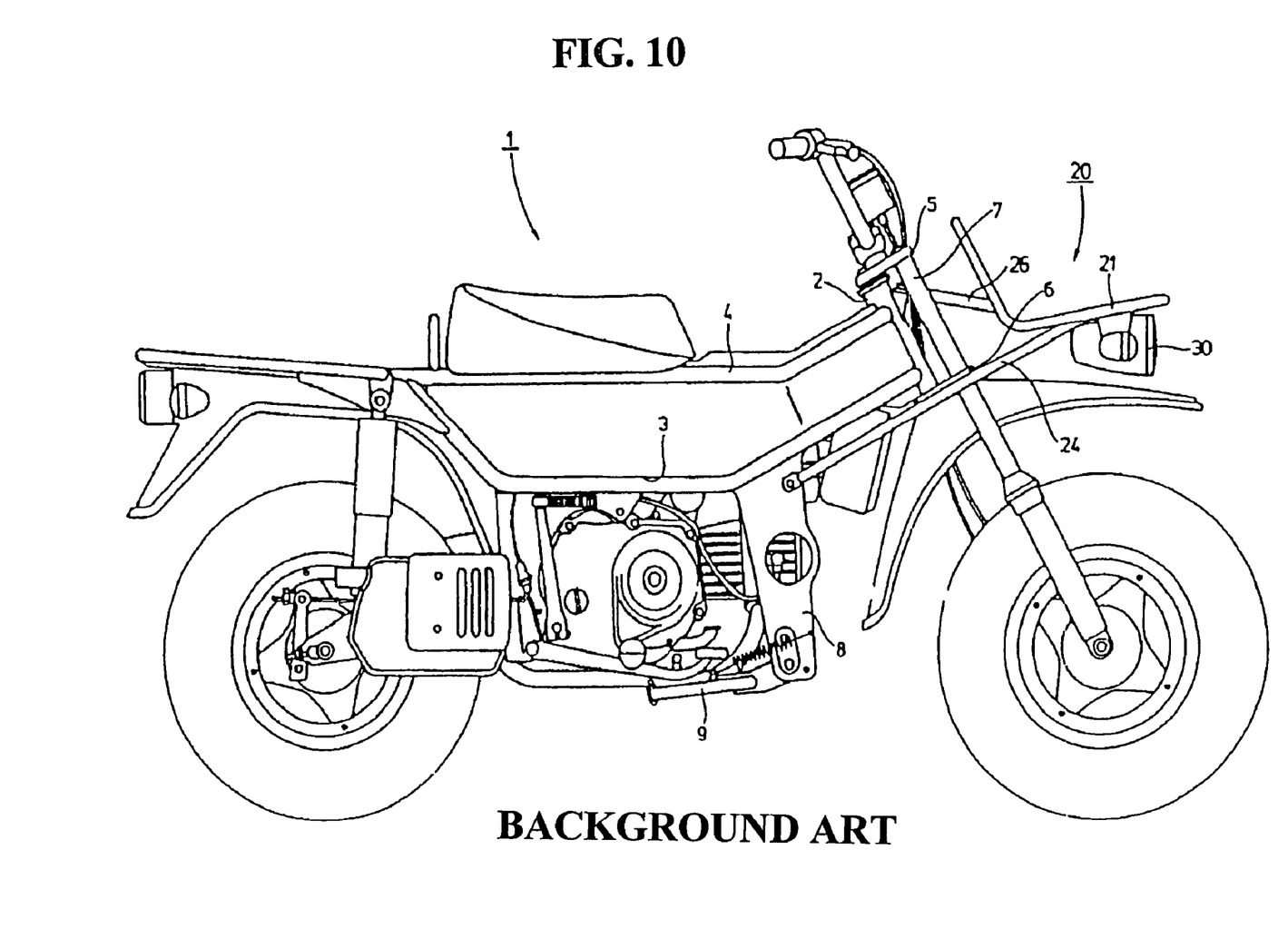
FIG. 10 is a motorcycle according to the background art.

In the background art, various types of motorcycles are in practical use. For example, Japanese Utility Model Application Laid-open No. Sho. 59-42771 discloses a motorcycle according to the background art. Referring to FIG. 10 of the present invention, FIG. 1 of the JP 59-42771 document is reproduced. FIG. 10 of the present invention illustrates a motorcycle 1 including an exposed head pipe 2. A meter unit (not identified by a reference numeral) is disposed upwardly of the head pipe 2. A main frame 21 is supported by a lower supporting arm 24 and an upper supporting arm 26 extending from the vehicle body frame at a front thereof. Supporting the main frame 21 in this manner allows a load to be supported by the main frame 21.

However, in a mid-sized motorcycle or larger, the situation occurs where the meter unit is disposed forwardly of the head pipe, and not above the head pipe, due to the position of the rider. In order to dispose the meter unit forward in this manner, it is necessary to avoid interference between the main frame 21 and the meter unit.

However, when providing an additional guard member to avoid interference, an increase in the number of components occurs, and maintaining the appearance of the motorcycle must be taken into account. While covering the exposed head pipe with a cover in order to improve the appearance is possible, there is a limit in the external shape or layout of the main frame or the meter unit.

SUMMARY OF THE INVENTION

It is an object of the present invention to ensure a sufficient loading capacity, to dispose a meter unit at an optimal position, and to improve the appearance of a motorcycle in which a load can be placed at the front thereof.

In order to achieve the above described object, a first aspect of the present invention is directed to a front structure of a motorcycle including a head pipe at the front of a vehicle body frame, which is covered by a handle post cover. A closed portion of a separate frame of substantially U-shape in plan view protrudes forward from the vehicle body frame. A load receiving pipe of inverted U-shape in front view extends upward from the separate frame along the front surface of the handle post cover. Furthermore, the closed portion of the load receiving pipe passes around the front portion of a meter unit.

The appearance can be improved by covering the head pipe with the handle post cover. The appearance can be improved by integrating the load receiving pipe with the separate frame, and forming the separate frame and the load receiving pipe into a substantially U-shape so that the integrated member is formed into a combination of a straight line and a curved line.

By passing the load receiving pipe around the front portion of the meter unit, the probability that the load comes into contact with the meter unit can be avoided. Therefore, according to the first aspect of the present invention, the appearance of the front portion of the vehicle body can be improved while improving the load receiving capacity of the front portion of the vehicle body.

According to a second aspect of the present invention, the closed portion of the inverted U-shaped load receiving pipe is bent frontward of the vehicle body so as to pass around the front portion of the meter unit, so that the load receiving pipe and the front portion of the separate frame form an angular C-shape in side view.

A load may be placed on the portion of the angular C-shape in side view formed by the load receiving pipe and the front portion of the separate frame. Since it is formed into an angular C-shape, a cord or a rope for fixing the load can easily be tied. In addition, downward movement of the load can be received by the separate frame, and lifting or the rearward movement of the load can be received by the load receiving pipe.

According to a third aspect of the present invention, the front surface of the handle post cover is a flat surface extending along a lower leg, which constitutes the lower portion of the load receiving pipe. By forming the front surface of the handle post cover into a flat surface, the load can be received with a surface together with the load receiving pipe.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to the attached drawings, an embodiment of the present invention will be described. The drawings are to be viewed so that the reference numerals are oriented in an upright manner.

In the present embodiment, a low-deck vehicle is described, taking a scooter-type vehicle as an example. However, it should be noted that the low-deck vehicle according to the present invention may be a two, three or four wheel vehicle. Specifically, the low deck vehicle may be of any type, as long as a front wheel and a rear wheel are provided at the front and the rear of a vehicle body frame, and a main frame of the vehicle body frame, which extends rearward from a head pipe, is formed into a V- or U-shape in side view, so that the rider can easily straddle the main frame.

Figure 1:
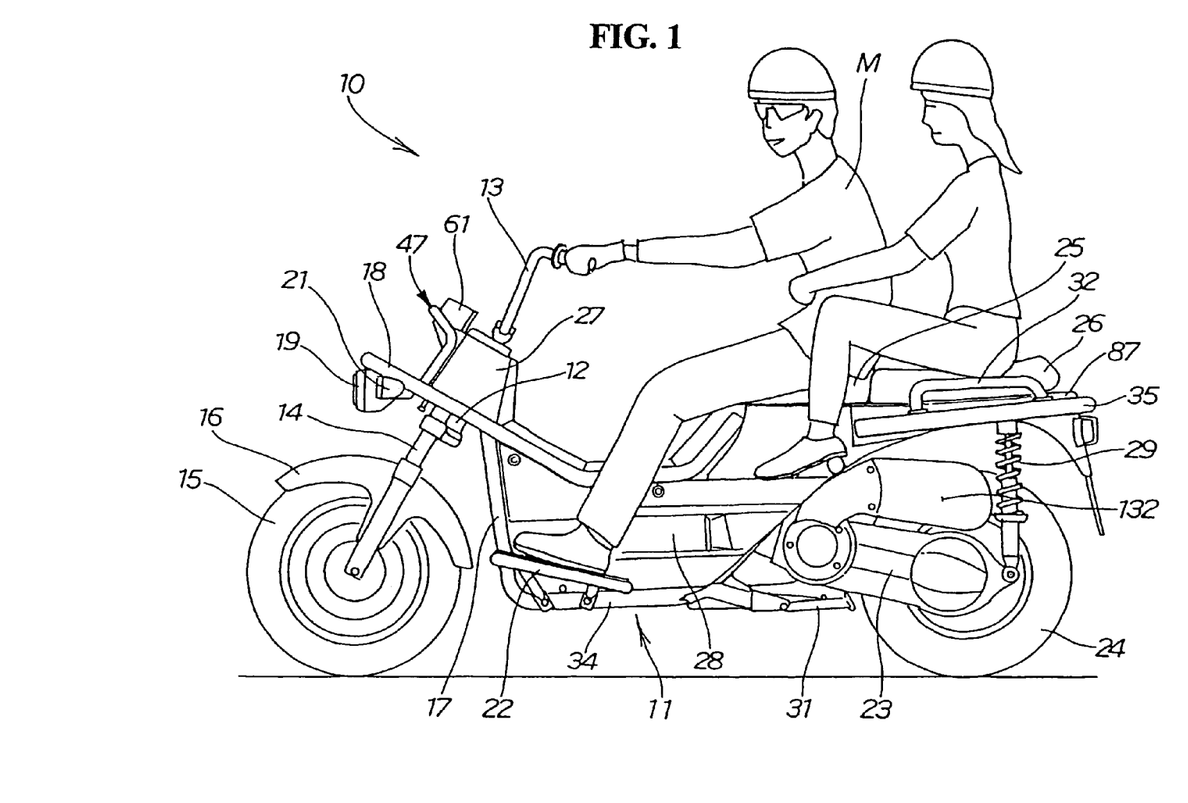
FIG. 1 is a side view of a scooter-type vehicle according to the present invention.

FIG. 1 is a side view of a scooter-type vehicle according to the present invention. A scooter-type vehicle 10 is basically constructed by steerably attaching a steering handle 13 to a head pipe 12 at the front of a vehicle body frame 11, and mounting a front wheel 15 and a front fender 16 to a front fork 14 connected to the steering handle 13.

The scooter-type vehicle is a light-weight, two-seater vehicle including a separate frame 18 attached to the vehicle body frame 11. A head lamp 19 and turn signal lamps 21 are mounted to the separate frame 18. Steps 22 are mounted to down tubes 17. A power unit 23 is mounted at the rear of the vehicle body frame 11 so as to be capable of vertical swinging motion. A rear wheel 24 is mounted at the rear of the power unit 23. A rider's seat 25 is provided forwardly and obliquely upwardly of the rear wheel 24. Furthermore, a passenger's seat 26, which also serves as a seat back, is provided above the rear wheel 24.

Reference numeral 27 in the drawing designates a handle post cover, reference numeral 28 designates a side cover, reference numeral 29 designates a rear cushion, reference numeral 31 designates a stand, and reference numeral 32 designates a grab rail.

Figure 2:
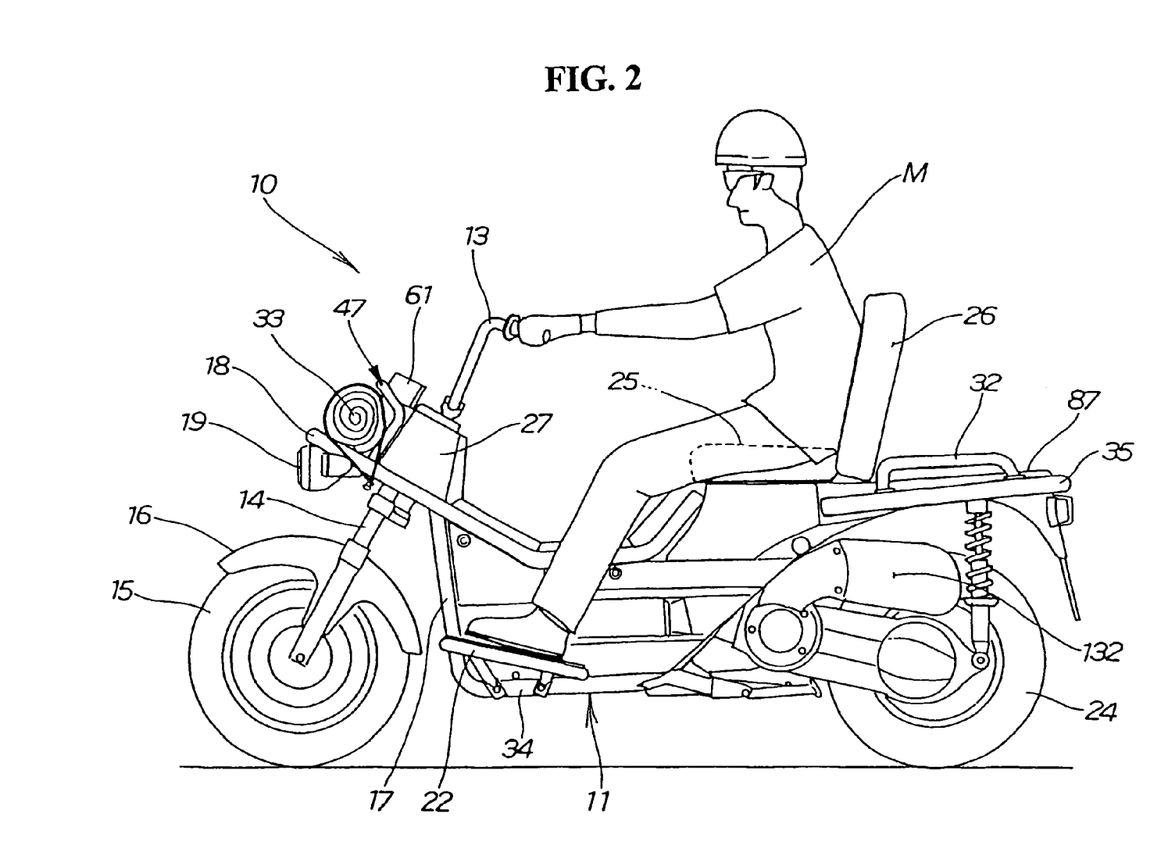
FIG. 2 is a side view of the scooter-type vehicle according to the present invention modified into a single-seat mode.

FIG. 2 is a side view of the scooter-type vehicle according to the present invention, which is modified into a single-seat mode. Since the basic structure is the same as FIG. 1, a description of the elements that are in common with FIG. 1 will be omitted. FIG. 2 illustrates the passenger's seat 26, which serves as the seat back, moved to the upright position to form a backrest for a rider M, i.e., modified into a seatback. FIG. 2 also illustrates that a load 33 such as a tent is placed at the front of the separate frame 18. In FIG. 2, reference numeral 87 designates a rear load-carrying platform, and reference numeral 132 designates an air cleaner. In addition, the steering handle 13, the grab rails 32, the separate frame 18, the down tube 17, a lower pipe 34 and a rear frame 35 extending from the down tube 17 are exposed.

In the scooter-type vehicle in the background art, normally, the vehicle body frame is covered by the vehicle body cover, and most of the parts of the vehicle body frame are not exposed. In contrast, according to the present invention, most of the parts of the vehicle body frame are exposed so that an unnatural appearance is demonstrated.

Figure 3:
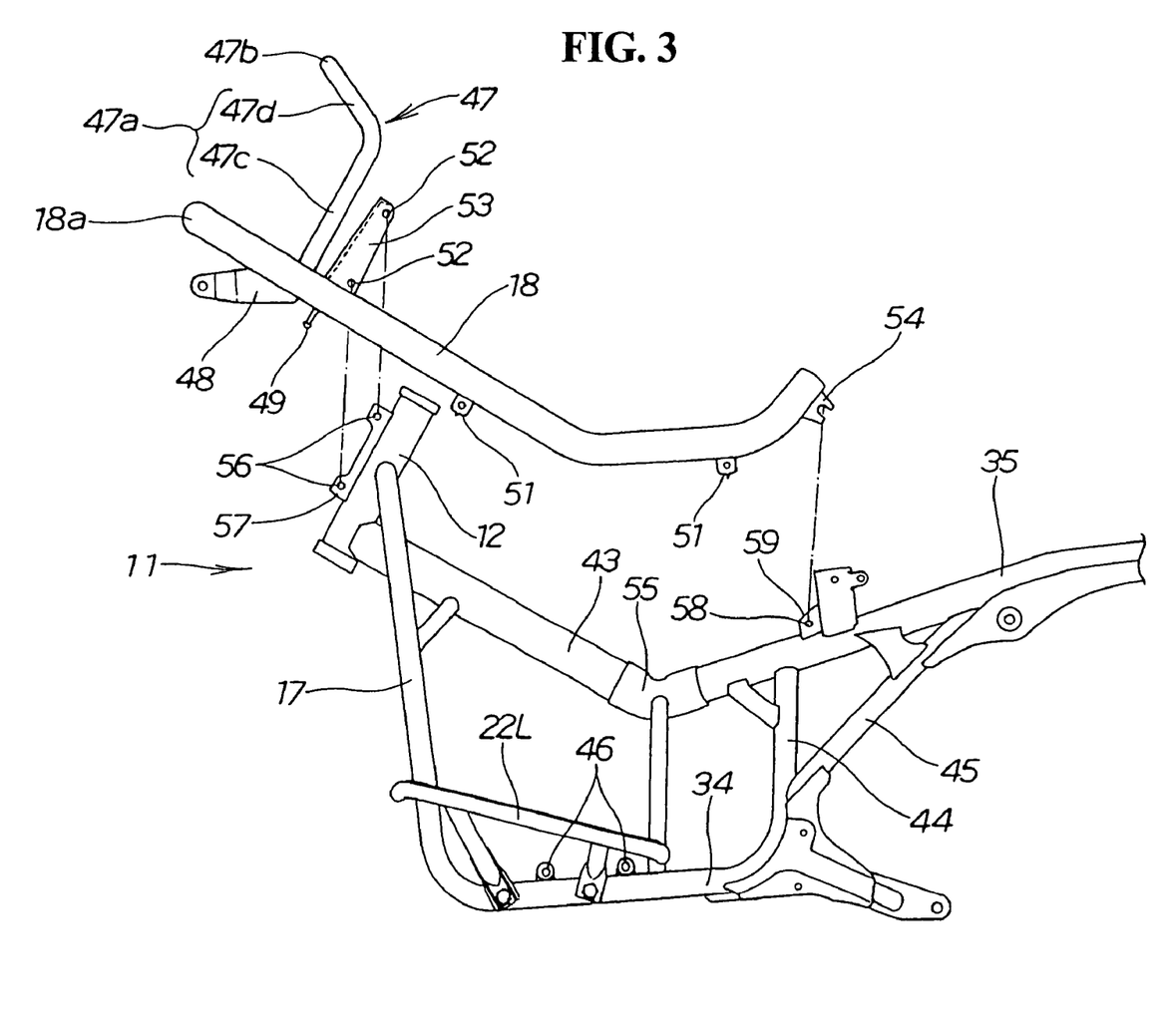
FIG. 3 is an exploded view of a vehicle body frame of the scooter-type vehicle according to the present invention.

FIG. 3 is an exploded view of the vehicle body frame of the scooter-type vehicle according to the present invention. The vehicle body frame 11 includes a main frame 43 extending from the head pipe 12 and formed into the V- or U-shape in side view. A rear frame 35 constitutes the rear portion of the main frame 43 and extends rearward. A down tube 17 extends downward from the head pipe 12. A lower pipe 34 extends substantially horizontally from the down tube 17. A center frame 44 extends upward from the rear end of the lower pipe 34. Furthermore, a stay 45 connects the center frame 44 and the rear frame 35. The lower pipe 34 is provided with cover securing plates 46, 46.

The separate frame 18 illustrated in FIG. 3 has a simple structure. The separate frame 18 will be described below. In addition, the vehicle body frame 11 will be described below in conjunction with FIG. 7.

The separate frame 18 includes a load receiving pipe 47 provided on the upper surface of the front portion thereof. A lamp supporting bracket 48 and a loading hook 49 are provided on the lower surface of the front portion of the frame 18. Cover securing plates 51, 51 are provided on the lower surface of the frame 18. A bracket 53 is provided on the upper surface of the front portion of the frame 18. The bracket 53 includes holes 52, 52 formed therethrough. Furthermore, a U-shaped bracket 54 is provided on the lower surface of the rear portion of the frame 18.

On the other hand, the head pipe 12 includes a front plate 57 on the front surface thereof. The front plate 57 has holes 56, 56 formed therethrough. In addition, the rear frame 35 includes a rear plate 59 on the upper surface of the front portion thereof. The rear plate 59 has a hole 58 formed therethrough.

The rear plate 59 is disposed in the vicinity of a joint 55 between the main frame 43 and the rear frame 35. The joint 55 is a portion where the one main frame 43 and the two rear frames 35 converge. In view of this, the joint 55 has a high-rigidity. By providing a rear plate 59 in the vicinity (rearwardly thereof in the embodiment) of the joint 55, it is advantageous in terms of strength for supporting the separate bracket 18.

The separate frame 18 can be integrated with the head pipe 12 and the main frame 43 by fastening the bracket 53 to the front plate 57 with bolts or other separable fasteners and fastening the U-shaped bracket 54 to the rear plate 59 with bolts or other separable fasteners. The shape of the frames after integration will be described in conjunction with FIG. 5.

Figure 4:
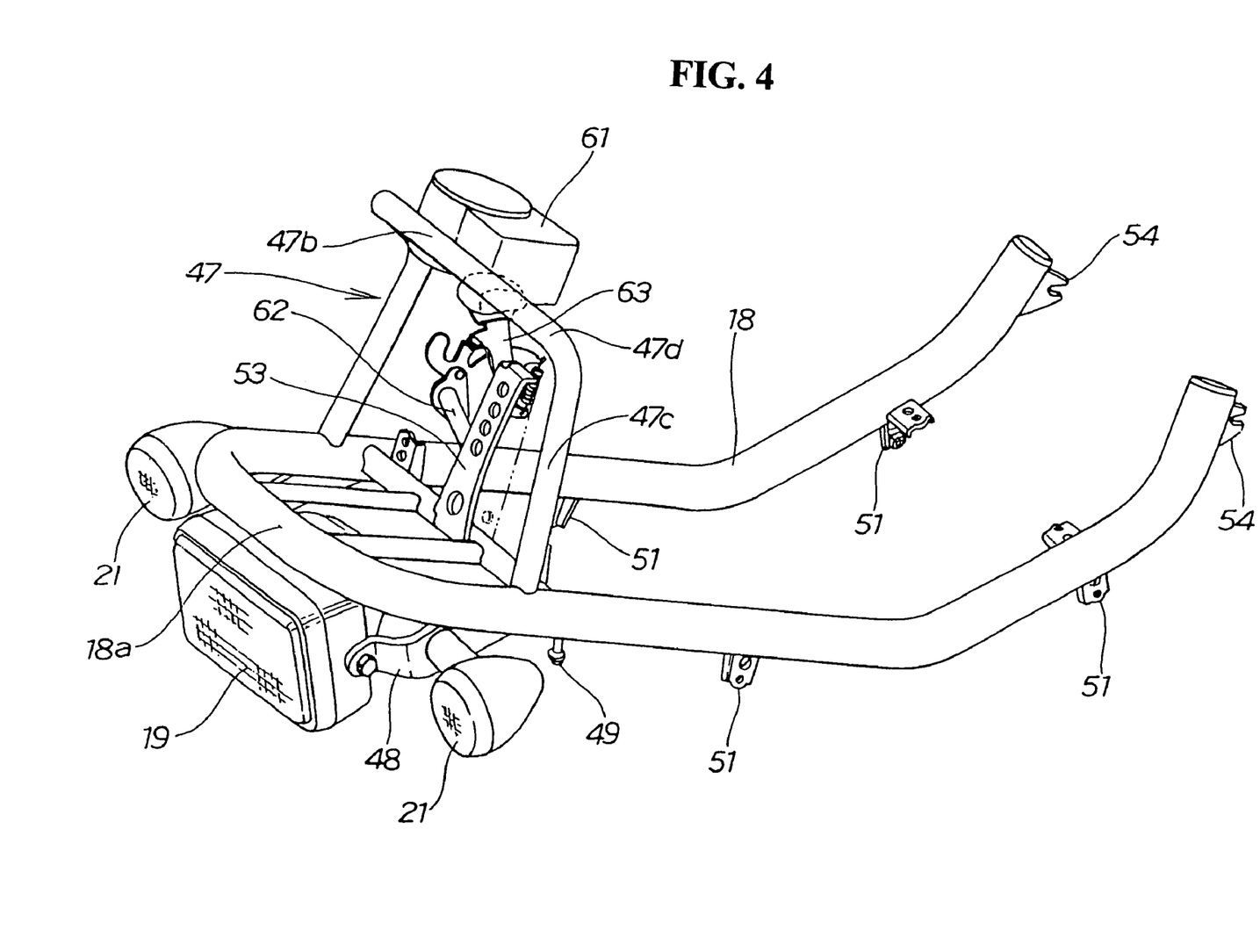
FIG. 4 is an explanatory drawing showing the operation of the separate frame according to the present invention.

FIG. 4 is an explanatory drawing showing the operation of the separate frame according to the present invention. The separate frame 18 is a pipe frame formed into a U-shape in plan view. The separate frame 18 is configured in such a manner that the turn signal lamps 21, 21 and the head lamp 19 can be mounted to the lamp supporting bracket 48. In addition, parking brake levers 63 can be mounted to the right side of the bracket 53 via a stay 62.

It is also possible to reduce the time required for assembly in an assembly line, for example, by assembling the vehicle components such as the turn signal lamps 21, the head lamp 19, a meter unit 61, and the parking brake levers 63 to the separate frame 18 in advance (referred to as sub-assembly). It is then possible to assemble the sub-assembly (the assembly shown in FIG. 4 as a whole) to the head pipe 12 and the main frame 43 shown in FIG. 3.

Figure 5:
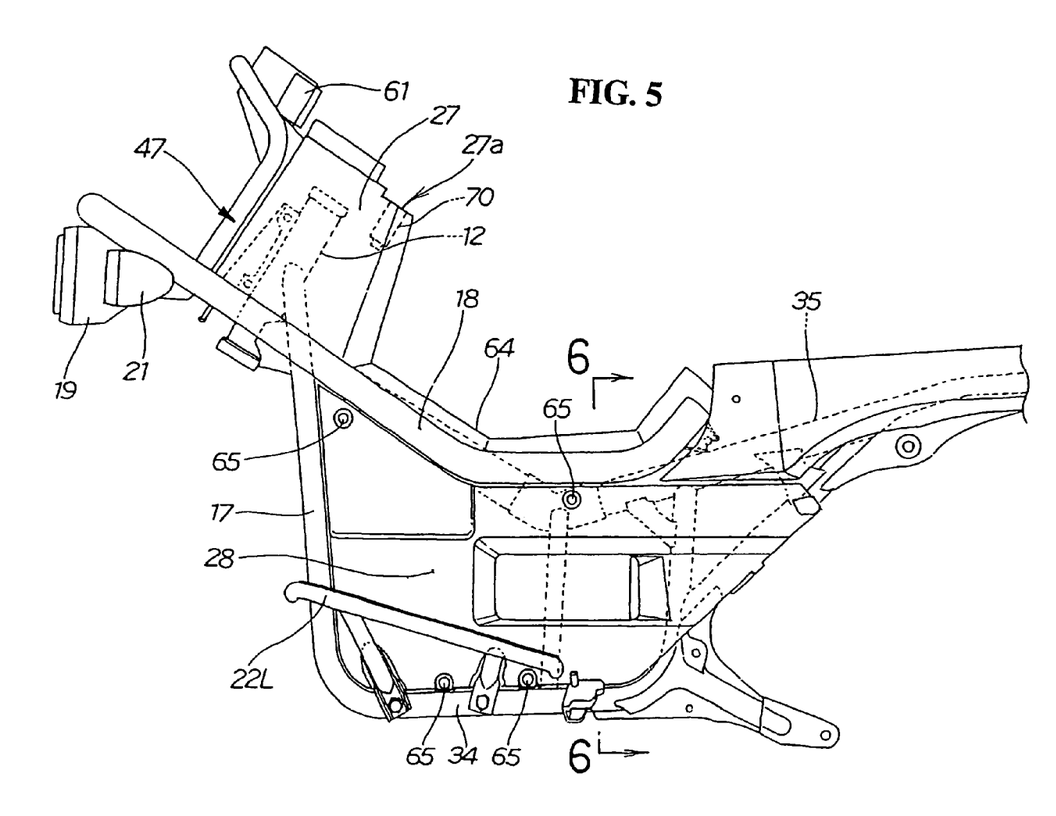
FIG. 5 is a side view of the vehicle body frame of the scooter-type vehicle according to the present invention.

FIG. 5 is a side view of the vehicle body frame of the scooter-type vehicle according to the present invention, showing that the separate frame 18 is mounted to the head pipe 12 and the rear frame 35. A center cover portion 64 including the integrally formed handle post cover 27 is covered on the separate frame 18. The center cover portion 64 covers between the opposing legs of the separate frame 18. The side cover 28 is mounted between the separate frame 18 and the lower pipe 34 with bolts or other separable fasteners 65. Furthermore, a step 22L is mounted to the lower pipe 34.

As shown in FIG. 5, a structure is employed in which the front surface of the handle post cover 27 is a flat surface so that a front load-carrying space can be sufficiently obtained. A shelf portion 27a, which is taken one step downward, is formed at the rear on top of the handle post cover 27. Furthermore, combi-lock device 70 can be mounted on the shelf portion 27a.

In the present invention, the so-called combi-lock device 70, which is a combination switch including a handle lock mechanism integrated therein, is employed. Since most of the parts of the combi-lock device 70 are covered by the handle post cover 27, the combi-lock device 70 is in no danger of being damaged due to mischief.

Figure 6:
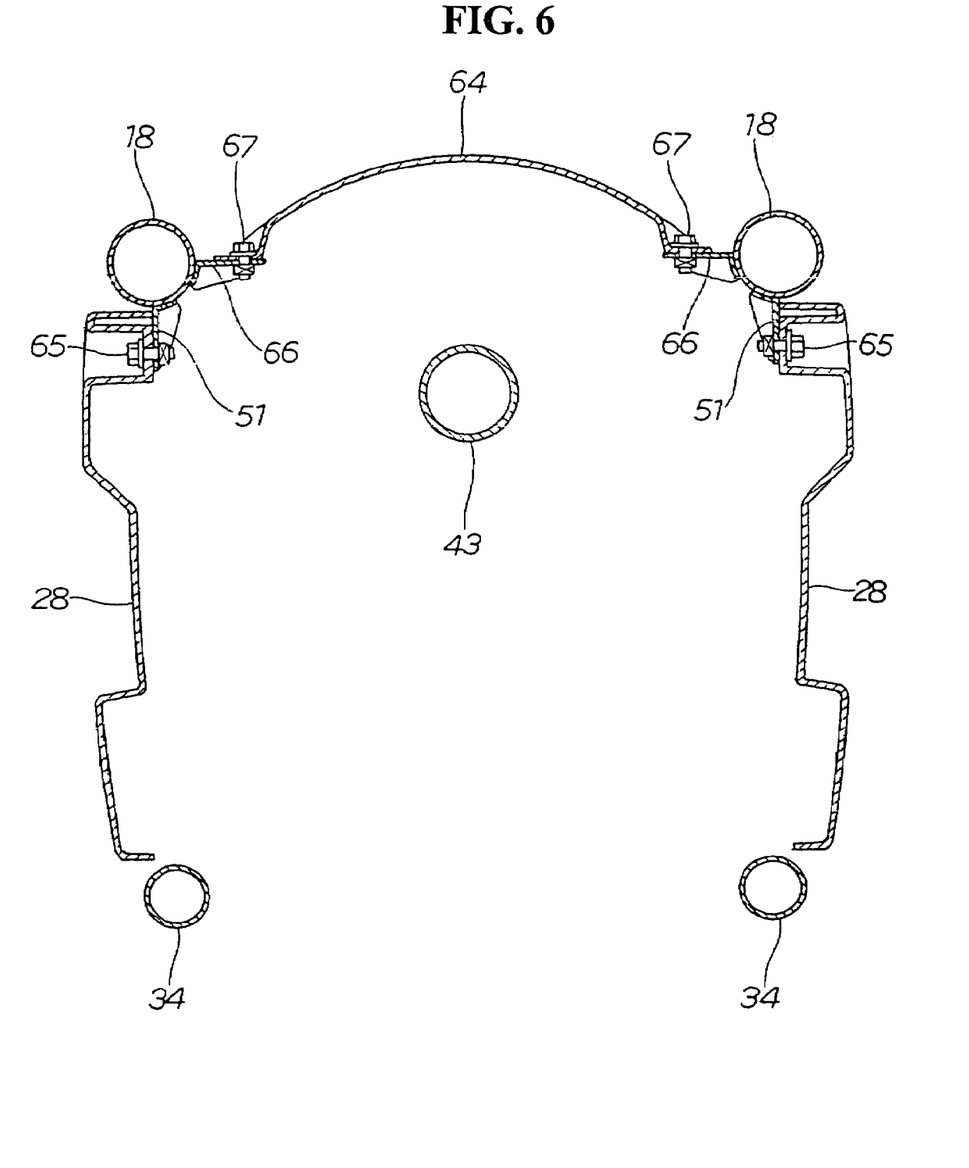
FIG. 6 is a cross-sectional view taken along the line 6-6 in FIG. 5.

FIG. 6 is a cross-sectional view taken along the line 6-6 in FIG. 5, showing that the center cover portion 64 is attached to cover securing plates 66, 66 provided on the separate frame 18 with bolts or other separable fasteners 67, 67. In addition, the side covers 28, 28 are attached to the cover securing plates 51, 51 with the bolts or other separable fasteners 65, 65. When an attempt is made to secure the center cover portion 64 and the side covers 28, 28 to the main frame 43 with bolts or other separable fasteners, a large scale cover mounting bracket is required.

Further to the above, the present invention includes separate frames 18, 18 (although the separate frame 18 is a single piece, it is represented by two reference numerals for convenience) disposed above the left and the right lower pipes 34, 34. The center cover portion 64 and the side covers 28, 28 are mounted by skillfully handling the separate frames 18, 18.

As a consequence, the separate frames 18, 18 can be used for fixing the load. In addition, since the center cover portion 64 and the side covers 28, 28 (these members are referred to as the vehicle body cover) are disposed inside the separate frames 18, 18 and the left and the right lower pipes 34, 34, the vehicle body cover can be downsized as a whole. Hence, a light-weight and reduced cost vehicle body cover can be obtained.

In addition, since the box-shaped vehicle body cover is surrounded by the separate frames 18, 18 and the lower pipes 34, 34, the container-like outline formed by the pipe frame is formed as a whole. Accordingly, the appearance is improved. In addition, as is clear from FIG. 6, a large scale cover mounting bracket is not necessary. Therefore, a reduction in the manufacturing cost of the vehicle body frame can be achieved.

Figure 7:
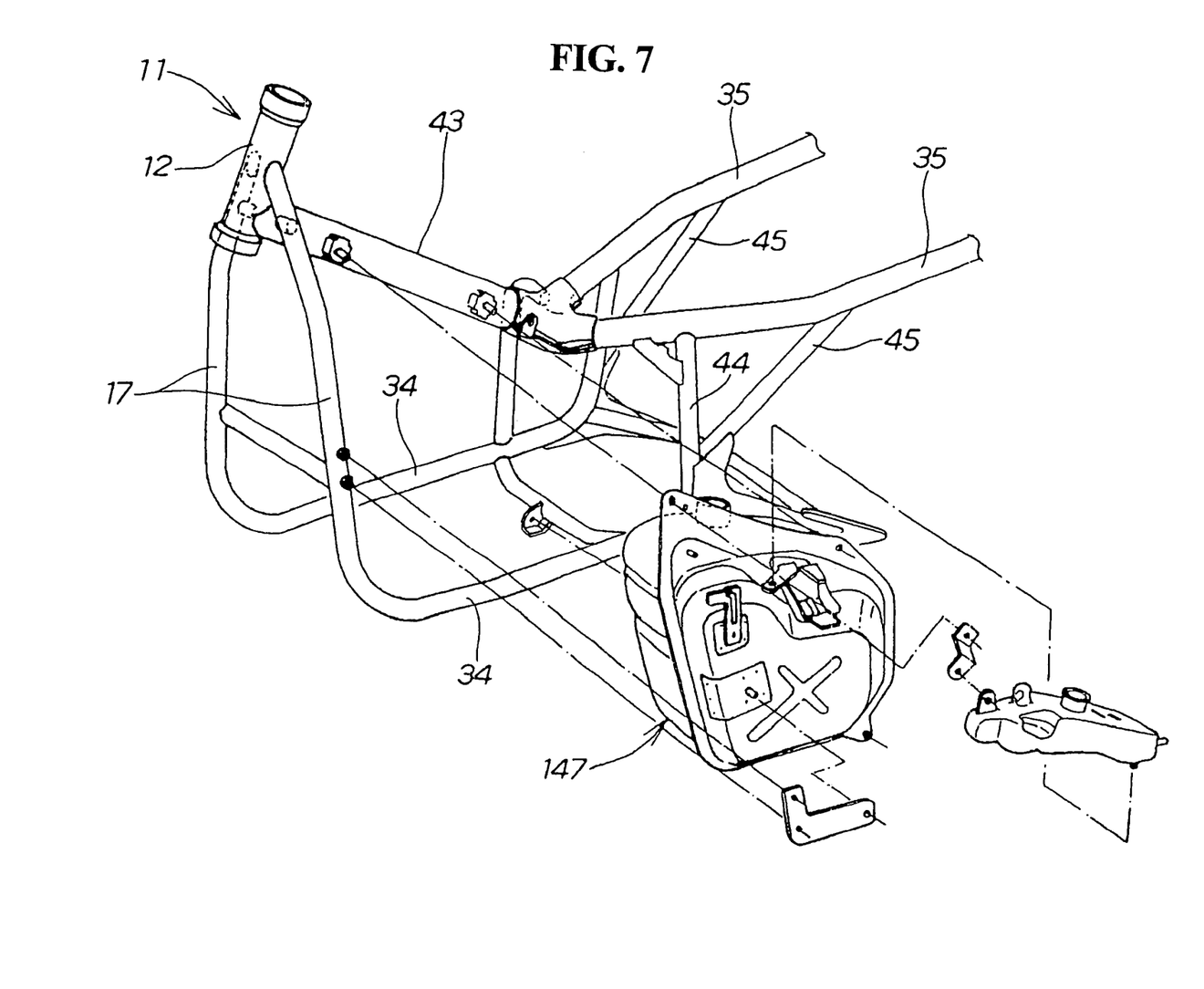
FIG. 7 is a perspective view of the vehicle body frame according to the present invention.

FIG. 7 is a perspective view of the vehicle body frame according to the present invention, showing that the main frame 43 extends from the head pipe 12. In addition, the two rear frames 35, 35, which are normally referred to as seat rails, extend from the main frame 43. Reference numeral 147 designates a fuel tank to be mounted to the vehicle body frame 11.

Figure 8:
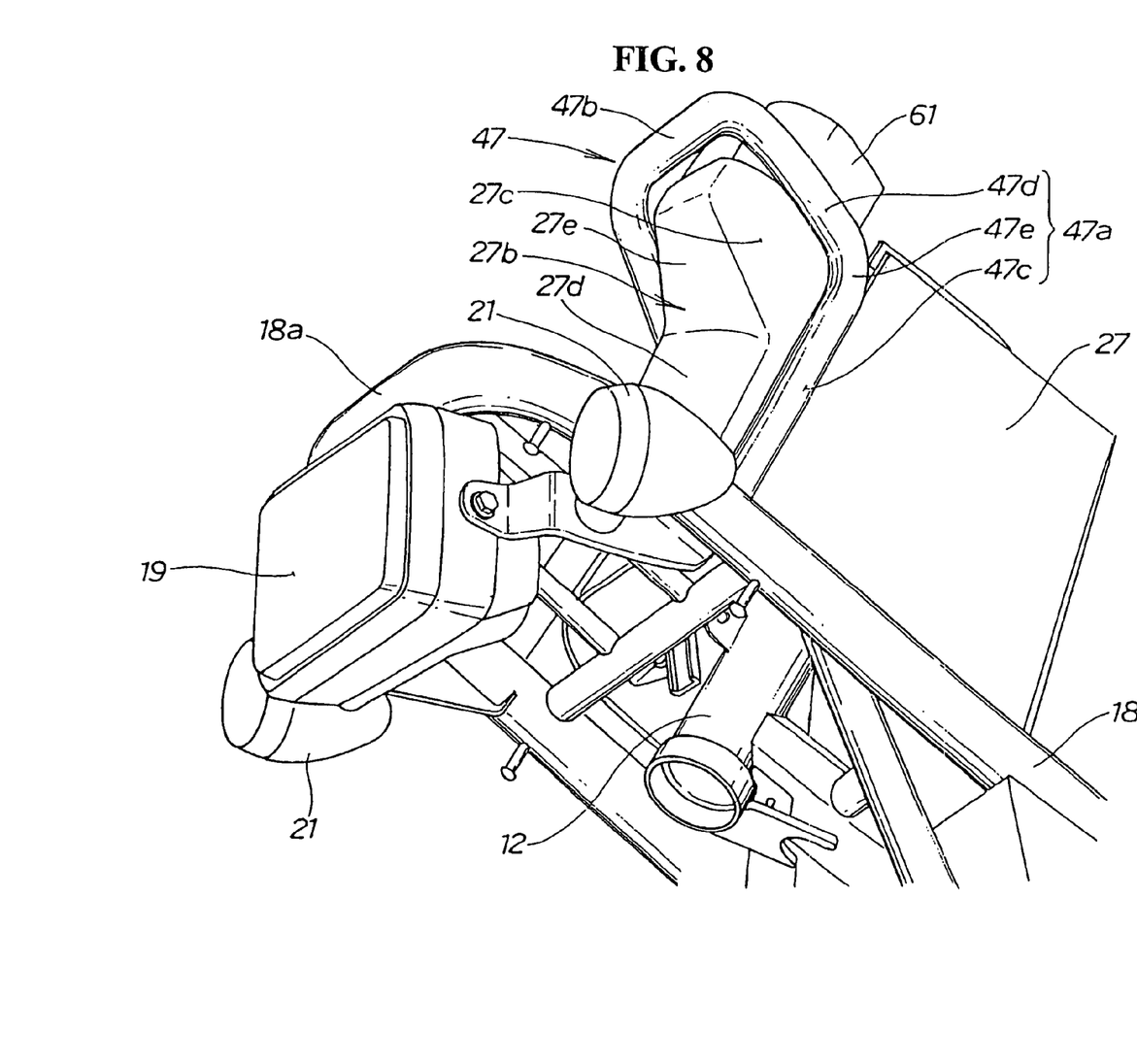
FIG. 8 is a perspective view showing the front structure of a motorcycle according to the present invention.

FIG. 8 is a perspective view showing the front structure of the motorcycle according to the present invention. Referring to FIG. 8, the head pipe 12 is surrounded by the handle post cover 27. In addition, the separate frame 18 is of substantially U-shape in plan view and protrudes toward the front so that a closed portion 18a faces toward the front.

In addition, FIG. 8 illustrates that the load receiving pipe 47 of inverted U-shape in front view extends from the separate frame 18 along a front surface 27b of the handle post cover 27 (in the embodiment, the front surface 27b of a protruded portion 27c of the post cover mounted to the handle post cover 27) with a closed portion 47b thereof oriented upward to allow the load to be placed in front of the load receiving pipe 47. In addition, the closed portion 47b of the load receiving pipe 47 passes around the front portion of the meter unit 61 so that the meter unit 61 is guarded by the closed portion 47b.

The protruded portion 27c of the post cover is a portion constituting part of the handle post cover 27. Therefore, the handle post cover 27 may be formed either by integrally attaching the protruded portion 27c of the post cover afterwards, or by molding integrally with the protruded portion 27c of the post cover during the stage of resin molding.

The appearance may be improved by surrounding the head pipe 12 by the handle post cover 27. The appearance may also be improved by integrating the load receiving pipe 47 with the separate frame 18 and forming both of the separate frame 18 and the load receiving pipe 47 into a substantially U-shape so as to form the integrated member into a combination of a straight line and a curved line.

In addition, the load receiving pipe 47 includes left and right legs 47a, 47a (the 47a on the far side is hidden and hence cannot be seen) extending upward from the separate frame 18 and the closed portion 47b connecting the ends of the legs 47a, 47a. In addition, the leg 47a is sectionalized into a lower leg 47c located on the lower side and an upper leg 47d located on the upper side and is bent forwardly at a boundary 47e between the upper and lower legs 47c, 47d. In view of this, the separate frame 18, the lower leg 47c and the upper leg 47d form an angular C-shape in side view.

The load can be placed on the portion of the angular C-shape in side view formed by the separate frame 18, the lower leg 47c and the upper leg 47d. Since it is formed into the angular C-shape, a cord or a rope for fixing the load can easily be tied. In addition, downward movement of the load can be received by the separate frame 18, lifting of the load can be held by the upper leg 47d, and the rearward movement of the load can be held by the lower leg 47c.

Furthermore, the handle post cover 27 includes the front surface 27b thereof forming a flat surface 27d extending along the lower leg 47c, and a flat surface 27e extending substantially along the upper leg 47d. By forming the front surface 27b of the handle post cover 27 into the flat surfaces 27d, 27e, the load can be received with a surface together with the load receiving pipe 47.

Figure 9:
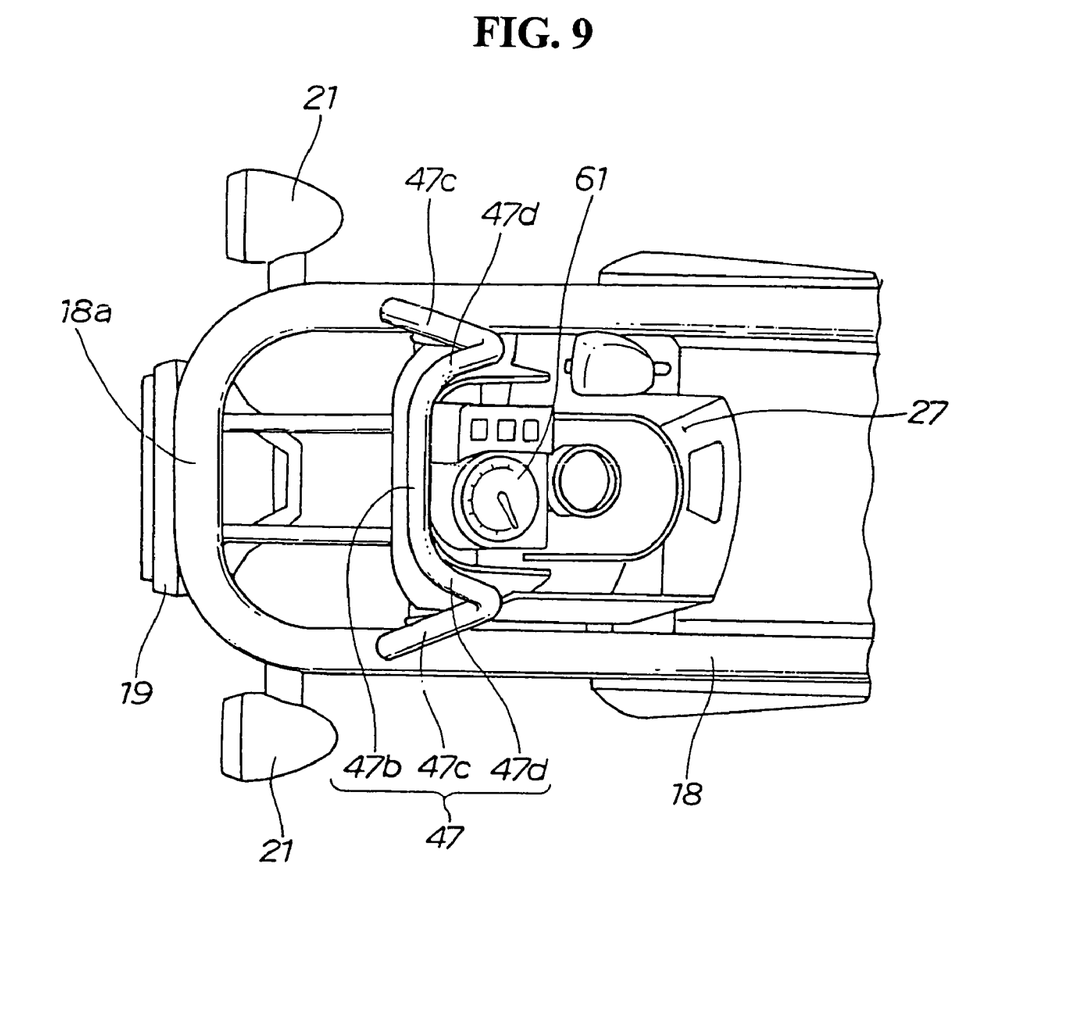
FIG. 9 is a plan view showing the front structure of the motorcycle according to the present invention.

FIG. 9 is a plan view showing the front structure of the motorcycle according to the present invention. Referring to FIG. 9, the separate frame 18 is a member of substantially U-shape in front view having a closed portion 18a at the extremity thereof. The load receiving pipe 47 extending from the separate frame 18 also includes the closed potion 47b at the extremity thereof.

The closed portion 47b is then passed around the front portion of the meter unit 61. Accordingly, the meter unit 61 can be accommodated in the limited space formed in front of the handle post cover 27 and behind the load receiving pipe 47. Therefore, the probability that the load comes into contact with the meter unit 61 can be avoided. In addition, the appearance of the front portion of the vehicle body can be improved while improving the load receiving capacity at the front of the vehicle body.

The separate frame according to the present invention must only be a member that can be mounted to an existing main frame or the main frame and the rear frame afterwards with bolts or other separable fasteners. The shape of the separate frame is arbitrary. The vehicle components to be mounted to the separate frame may be selected as desired.

With the arrangement described above, the present invention demonstrates the following effects.

According to the first aspect of the present invention, the appearance can be improved by covering the head pipe with the handle post cover. The appearance can be improved by integrating the load receiving pipe with the separate frame, and forming the separate frame and the load receiving pipe into the substantially U-shape so that the integrated member is formed into a combination of a straight line and a curved line.

By passing the load receiving pipe around the front portion of the meter unit, the probability that the load comes into contact with the meter unit can be avoided. Therefore, according to the first aspect of the present invention, the appearance of the front portion of the vehicle body may be improved while improving the load receiving capacity at the front of the vehicle body.

According to the second aspect of the present invention, the closed portion of the inverted U-shaped load receiving pipe is bent frontward of the vehicle body so as to pass around the front portion of the meter unit, so that the load receiving pipe and the front portion of the separate frame form an angular C-shape in side view.

A load may be placed on the portion of the angular C-shape in side view formed by the load receiving pipe and the front portion of the separate frame. Since it is formed into the angular C-shape, a cord or a rope for fixing the load can easily be tied. In addition, downward movement of the load can be received by the separate frame, and lifting or the rearward movement of the load can be received by the load receiving pipe.

According to the third aspect of the present invention, the front surface of the handle post cover is a flat surface extending along a lower leg, which constitutes the lower portion of the load receiving pipe. By forming the front surface of the handle post cover into the flat surface, the load can be received with a surface together with the load receiving pipe.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front structure of a motorcycle, comprising:
   a head pipe at a front of a vehicle body frame, said head pipe being covered by a handle post cover;
   a separate frame, said separate frame being of substantially U-shape in plan view, a closed portion of said separate frame protruding forward from the vehicle body frame;
   a load receiving pipe, said load receiving pipe being of inverted U-shape in front view, said load receiving pipe extending upward from the separate frame along the front surface of the handle post cover, said load receiving pipe including a closed portion that passes around a front portion of a meter unit of the motorcycle; and
   wherein said handle post cover includes a center cover portion formed integrally therewith, said center cover portion covering between opposing legs of the separate frame.

2. The front structure of a motorcycle according to claim 1, wherein the closed portion of the load receiving pipe is bent frontward of the vehicle body so as to pass around the front portion of the meter unit, so that the load receiving pipe and the front portion of the separate frame form an angular C-shape in side view.

3. The front structure of a motorcycle according to claim 2, wherein the front surface of the handle post cover is a flat surface extending along a lower leg of the load receiving pipe.

4. The front structure of a motorcycle according to claim 1, wherein the front surface of the handle post cover is a flat surface extending along a lower leg of the load receiving pipe.

5. The front structure of a motorcycle according to claim 1, wherein the separate frame and the load receiving pipe are a single one piece structure that is secured to the vehicle body frame by separable fasteners.

6. The front structure of a motorcycle according to claim 1, wherein said handle post cover includes a shelf portion that steps downward and rearward from a top of the handle post cover, said shelf portion including a lock device mounted thereon.

7. The front structure of a motorcycle according to claim 1, wherein the vehicle body frame includes a lower pipe, the front structure of the motorcycle further comprising a pair of side covers mounted between the separate frame and the lower pipe.

8. The frame structure for a motorcycle according to claim 1, wherein the metering unit is located on the handle post cover.

9. The frame structure for a motorcycle according to claim 1, wherein the handle post cover encloses a top of the head pipe and a portion of the side of the head pipe.

10. A frame structure for a motorcycle, comprising:
    a vehicle body frame, said vehicle body frame including a main frame, a rear frame, a center frame, a down tube, a lower pipe and a head pipe;
    a separate frame, said separate frame being of substantially U-shape in plan view, a closed portion of said separate frame protruding forward from the vehicle body frame;
    a load receiving pipe, said load receiving pipe being of inverted U-shape in front view, said load receiving pipe extending upward from the separate frame at a location forward of the head pipe, said load receiving pipe including a closed portion that extends forward to form a space for receiving a front portion of a meter unit of the motorcycle,
    wherein the head pipe is covered by a handle post cover and the handle post cover includes a center cover portion formed integrally therewith, the center cover portion covering between opposing legs of the separate frame.

11. The frame structure for a motorcycle according to claim 10, wherein the closed portion of the load receiving pipe is bent frontward of the vehicle body so as to pass around the front portion of the meter unit, so that the load receiving pipe and the front portion of the separate frame form an angular C-shape in side view.

12. The frame structure for a motorcycle according to claim 11, wherein a front surface of the handle post cover is a flat surface extending along a lower leg of the load receiving pipe.

13. The frame structure for a motorcycle according to claim 10, wherein a front surface of the handle post cover is a flat surface extending along a lower leg of the load receiving pipe.

14. The frame structure for a motorcycle according to claim 10, wherein the separate frame and the load receiving pipe arc a single one piece structure that is secured to the main frame by separable fasteners.

15. The frame structure for a motorcycle according to claim 10, wherein a pair of side covers is mounted between the separate frame and the lower pipe of the vehicle body frame.

16. The frame structure for a motorcycle according to claim 10, wherein the metering unit is located on the handle post cover.

17. The frame structure for a motorcycle according to claim 10, wherein the handle post cover encloses a top of the head pipe and a portion of the side of the head pipe.

18. A frame structure for a motorcycle, comprising:
- a vehicle body frame, said vehicle body frame including a main frame, a rear frame, a center frame, a down tube, a lower pipe and a head pipe;
- a separate frame, said separate frame being of substantially U-shape in plan view, a closed portion of said separate frame protruding forward from the vehicle body frame;
- a load receiving pipe, said load receiving pipe being of inverted U-shape in front view, said load receiving pipe extending upward from the separate frame at a location forward of the head pipe, said load receiving pipe including a closed portion that extends forward to form a space for receiving a front portion of a meter unit of the motorcycle,
- wherein the head pipe is covered by a handle post cover, the handle post cover includes a shelf portion that steps downward and rearward from a top of the handle post cover, said shelf portion including a lock device mounted thereon.

19. A front structure of a motorcycle, comprising:
- a head pipe at a front of a vehicle body frame, said head pipe being covered by a handle post cover;
- a separate frame, said separate frame being of substantially U-shape in plan view, a closed portion of said separate frame protruding forward from the vehicle body frame;
- a load receiving pipe, said load receiving pipe being of inverted U-shape in front view, said load receiving pipe extending upward from the separate frame along the front surface of the handle post cover, said load receiving pipe including a closed portion that passes around a front portion of a meter unit of the motorcycle; and
- wherein said handle post cover includes a shelf portion that steps downward and rearward from a top of the handle post cover, said shelf portion including a lock device mounted thereon.

20. A front structure of a motorcycle, comprising:
- a head pipe at a front of a vehicle body frame, said head pipe being covered by a handle post cover;
- a separate frame, said separate frame being of substantially U-shape in plan view, a closed portion of said separate frame protruding forward from the vehicle body frame;
- a load receiving pipe, said load receiving pipe being of inverted U-shape in front view, said load receiving pipe extending upward from the separate frame along the front surface of the handle post cover, said load receiving pipe including a closed portion that passes around a front portion of a meter unit of the motorcycle; and
- wherein the metering unit is located on the handle post cover.

* * * * *